May 19, 1942.  C. J. JAMES  2,283,442
PERIODIC SWITCH
Filed May 31, 1940  2 Sheets-Sheet 1
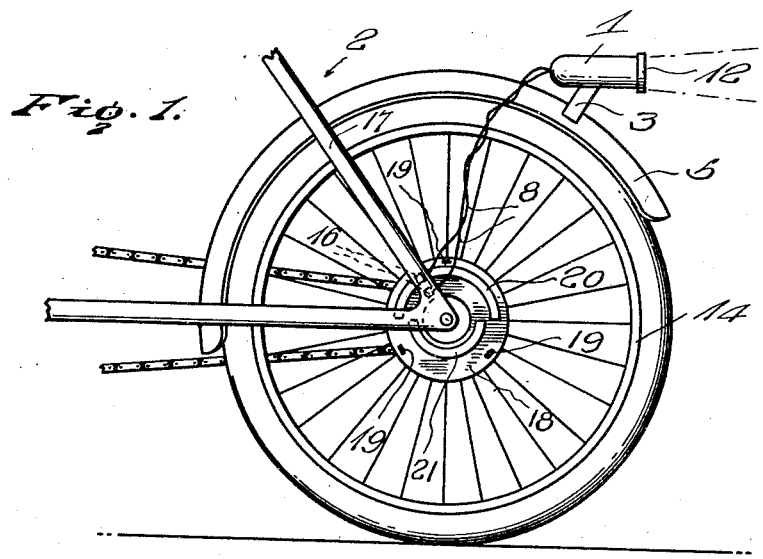
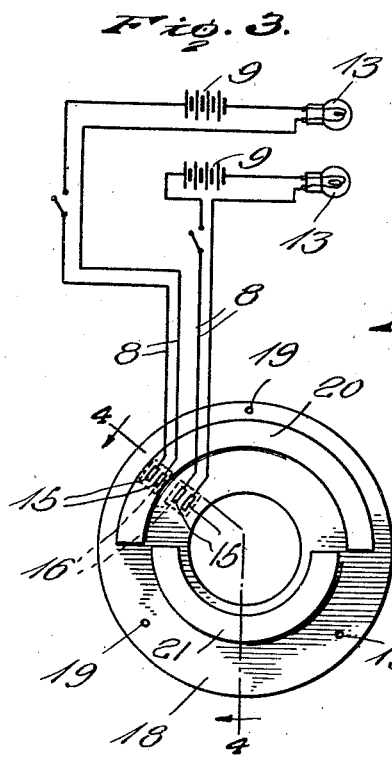
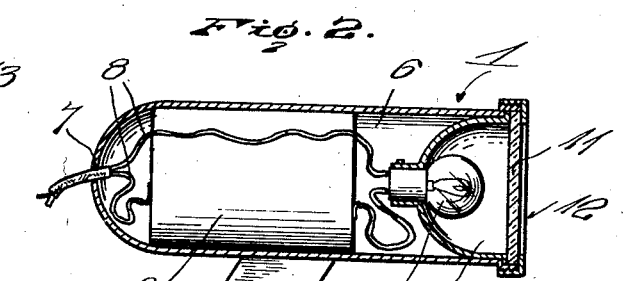
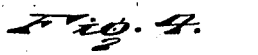
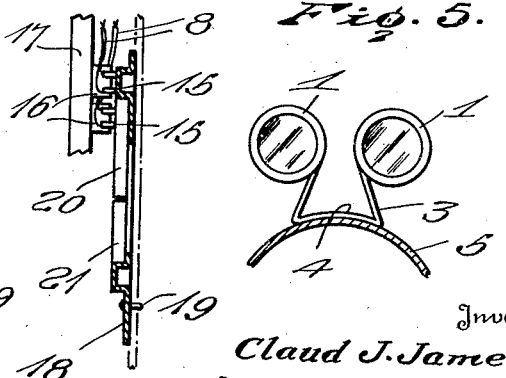
Inventor
Claud J. James.
By Ross J. Woodward
Attorney May 19, 1942.  C. J. JAMES  2,283,442
PERIODIC SWITCH
Filed May 31, 1940  2 Sheets-Sheet 2
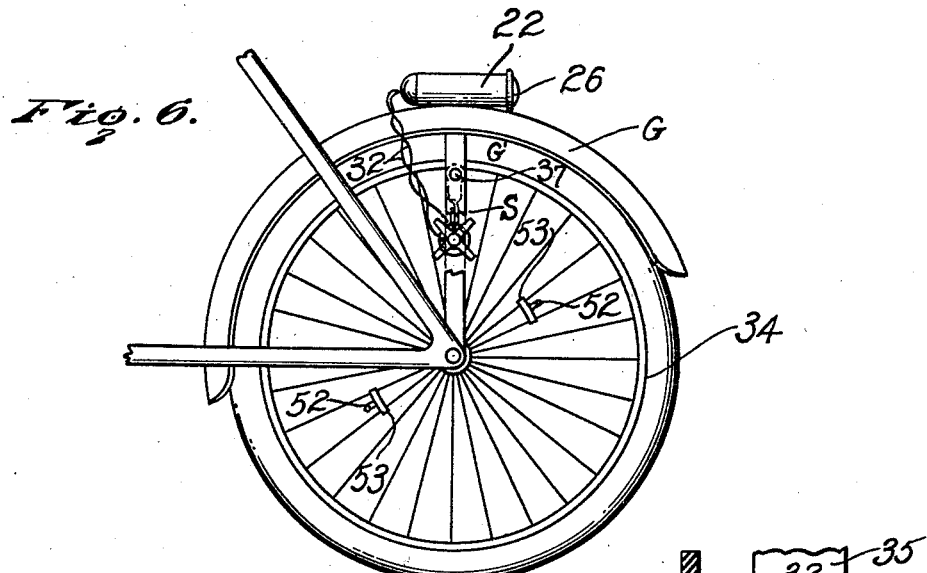
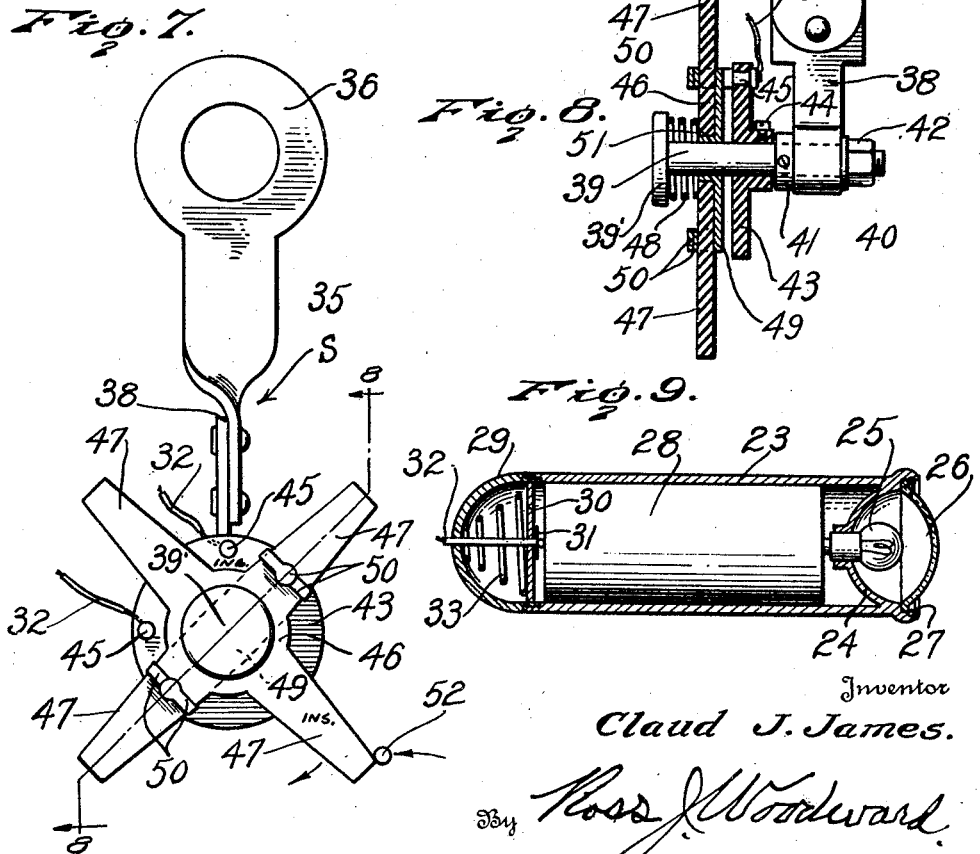
Inventor
Claud J. James.
By Ross J. Woodward.
Attorney Patented May 19, 1942

2,283,442

UNITED STATES PATENT OFFICE 2,283,442

PERIODIC SWITCH

Claud J. James, Milwaukee, Wis., assignor to Cyclite Company, Inc., Milwaukee, Wis., a corporation of Wisconsin Application May 31, 1940, Serial No. 338,280

2 Claims. (Cl. 200—30)

This invention relates to a switch which is particularly adapted for use in connection with a rear signal for a bicycle, motorcycle, or like vehicle, and it is one object of the invention to provide a switch so constructed that dual signal lights of a bicycle may be alternately lighted and thus at all times provide a signal light in operation but, at the same time, cause a flashing light which will attract the attention of the driver of an automobile and eliminate danger of a bicycle rider being struck and injured due to not being noticed by the driver of the automobile.

Another object of the invention is to provide an improved switch for closing circuits through a pair of signal lights adapted to be mounted on a bicycle at one side of the rear wheel and including stationary contacts alternately engaged to close circuits through the lights during turning of the rear wheel of the bicycle.

My invention is illustrated in the accompanying drawings, wherein:

Fig. 1 is a side elevation showing a dual signal light applied to a bicycle and equipped with a switch of the improved construction.

Fig. 2 is a sectional view on an enlarged scale, taken longitudinally through one of the lights.

Fig. 3 is a wiring diagram, together with the disc by means of which switches are alternately closed.

Fig. 4 is a sectional view taken through the disc, on the line 4—4 of Fig. 3.

Fig. 5 is a view looking at the rear ends of the lights and showing the bracket carrying the lights mounted on the rear mud guard which is shown in transverse section.

Fig. 6 is a view similar to Fig. 1, showing a modified construction.

Fig. 7 is an enlarged view of the switch.

Fig. 8 is a view taken on the line 8—8 of Fig. 7, showing the switch and its bracket partially in section and partially in elevation.

Fig. 9 is a sectional view taken longitudinally through one of the lights.

The dual signal with which the improved switch is used is intended for use on a bicycle and consists of a pair of lights 1 which are mounted at the rear of the bicycle 2 and alternately lighted, so that as one is turned on the other is extinguished. Therefore, a flashing signal will be displayed at the rear of the bicycle and attract the attention of the driver of an automobile approaching the bicycle from the rear.

In the embodiment of the invention illustrated in Figs. 1 through 5, the two lights are carried by the arms of a U-shaped bracket 3 having a bridge 4 which is curved longitudinally, as shown in Fig. 5, in order that it may be secured on the transversely curved rear mud guard 5 of the bicycle, with its arms projecting upwardly from the mud guard and supporting the lights in transverse spaced relation to each other.

The lights are of duplicate construction and each has a cylindrical casing 6 open at its rear end and having its front end closed by a head formed integral with the casing and perforated, as shown at 7, in order that wires 8 may pass into the casing through the rear thereof. A battery 9 is housed in the casing and into the rear end of the casing is fitted a reflector 10 against which is disposed a lens or glass disc 11 which closes the front end of the casing in shielding relation to the reflector and has been shown removably held in place by a securing ring 12. A bulb 13 is mounted centrally of the reflector in the usual manner and when the bulb is energized by closing of a circuit through the battery and bulb, light rays will be projected outwardly through the glass disc as indicated by dot and dash lines in Fig. 1.

The wires 8 of the lights are of sufficient length to extend downwardly at one side of the rear wheel 14 of the bicycle and have their ends secured to the terminals or contact members 15 of switches 16 mounted against one of the rear forks 17 between which the wheel 14 is rotatably mounted. The switches project from the fork toward the wheel and are to be alternately closed when the bicycle is in motion and the rear wheel is turning. In order to accomplish this, there has been provided a disc 18 formed of conductive material and secured by fasteners 19 in position against spokes of the wheel 17 about the hub thereof in concentric relation to the hub. Portions of the disc are stamped to form arcuate ribs 20 and 21 which project outwardly from the disc toward the fork carrying the switches 16. These ribs are in concentric relation to each other and the axle of the wheel 14 and it should be noted that they extend in opposite directions with their ends terminating substantially flush with a single diameter of the disc, as shown in Figs. 1 and 3. The inner rib 21 cooperates with the lower switch and the outer disc cooperates with the upper switch and the ribs alternately engage the companion switches as the wheel turns. Therefore, as the wheel turns, the lights will be alternately lighted and extinguished and produce a flashing signal, the flashes of which are transversely of the bicycle. Since the lights are alternately lighted and each is lighted as the other is extinguished, a continuous but flashing signal will be provided at the rear of the bicycle and attract the attention of the driver of an automobile or other vehicle approaching the bicycle from the rear.

Figs. 6 through 9 of the drawings illustrate a modified construction. In this embodiment, the two lights 22 may be mounted directly on the rear mud guard G in side by side relation to each other, or carried by a bracket as shown in Fig. 1. These lights are of duplicate construction and each has a cylindrical casing 23 carrying at one end a reflector 24 carrying a bulb 25 from which light rays are projected through a lens 26 removably held in place by a resilient wire or split ring 27. The lens, which is colored red, projects from the casing and, from an inspection of Fig. 1, it will be seen that when the signal lights are in operation, they may be readily seen from positions laterally of the bicycle as well as by a person directly behind the bicycle. The battery 28 is inserted in the casing through an open end thereof which is normally closed by a cap 29. Within the cap is a disc 30 of insulating material carrying a terminal 31 for the inner end of a conductor wire 32 and urged toward the battery by a spring 33 so that when a circuit is closed the light will be energized. The casing is grounded on the mud guard and only one wire 32 extends from the casing of each light.

The conductor wires are of sufficient length to extend downwardly and have their lower ends connected with a switch S which may be mounted on the support G' of the mud guard, as shown, or mounted on the axle of the rear wheel 34 of the bicycle. This switch has a bracket 35 formed of stiff metal and having one end formed with an eye 36 through which a fastener 37 is passed to firmly secure the bracket against the support for the mud guard. The free end portion of the bracket is twisted to dispose it transversely of the support and to this portion of the bracket is secured a bearing bracket 38. A shaft 39 is journaled through the bearing 40 of the bearing bracket where it is held by a collar 41 engaging one end of the bearing and a nut 42 which is screwed on the threaded end of the shaft and, when tightened, holds the shaft firmly in place through the bearing. A disc 43 of insulating material fits snugly about the shaft where it is firmly held in place by a set screw 44, and this disc carries terminals 45 to which the conductor wires 32 are attached. These terminals or stationary contacts 45 are spaced from each other ninety degrees and project from the disc of insulation for engagement by companion means to close circuits through the bulbs and cause the two lights to be alternately energized and create a flashing signal. The means which cooperates with the stationary contacts to close circuits through the bulbs of the two lights consists of a wheel or disc 46 formed of insulation and having arms 47 extending radially therefrom and so arranged that certain of the arms are in opposed relation to each other. The disc or wheel 46 fits about the shaft 39 between the disc 43 and the head 39' of the shaft and is urged toward the disc 43 by a spring 48 coiled about the shaft. A metal strip 49 constituting a movable contact extends along the inner face of the disc or wheel 46 and certain of the arms 47 thereof, where it is secured by clamping fingers 50 which are bent about the arms 47 and firmly hold the contact strip in proper position diametrically of the wheel. During rotation of the wheel, end portions of the movable contact strip alternately engage the stationary contacts 45 and, as each end portion of the movable contact strip moves across the stationary contacts, circuits will be closed through the bulbs of the two lights and the lights will be alternately energized. This will cause a flashing signal. The center portion 51 of the contact strip fits snugly about the shaft to complete grounding of the circuit through the lights. The wheel is to be intermittently turned and, in order to do so, there have been provided abutment fingers 52 carried by clips 53 which are fixed to spokes of the rear wheel 34 of the bicycle. The clips have been shown applied to the wheel in diametrically opposed relation to each other and, as the wheel turns, the fingers will move one after another into engagement with the arms or spokes of the wheel 46 and intermittently impart turning movement to the movable contact wheel. While two clips have been shown applied to the wheel 34, it will be obvious that others may be provided. Instead of securing the bracket against the support G' for the mud guard, its eye 36 may be fitted about the axle of the rear wheel and firmly gripped to maintain the bracket in an upright position with the contact wheel 46 in position for the fingers 52 of clips 53 to engage the arms 47 and turn the contact wheel during rotation of the bicycle wheel. The bicycle wheel turns rapidly and, since the contact wheel has movement imparted to it twice during each rotation of the bicycle wheel and each end of the contact strip 49 alternately engages the two stationary contacts 45, the two lights will be very rapidly turned on and off. Therefore, a flickering signal will be produced which will quickly attract the attention of the driver of an automobile approaching a bicycle from the rear and prevent danger of a person riding a bicycle being struck or injured, due to not being seen by the driver of the automobile.

Having thus described the invention, what is claimed is:

1. A switch comprising a bracket adapted to be mounted adjacent a wheel at one side thereof, a bearing carried by said bracket, a shaft extending through said bearing and rigidly secured with a portion projecting from the bearing and provided with a head, a disc of insulation about said shaft secured in a fixed position thereon, stationary contacts carried by said disc and spaced from each other circumferentially thereof, a movable disc of insulation rotatable about said shaft and having radiating arms, a contact carried by the movable disc and grounded on said shaft, and means for intermittently turning the movable disc to alternately move the contact thereof into and out of engagement with the contacts of the stationary disc during rotation of a bicycle wheel.

2. A switch comprising a bracket adapted to be mounted adjacent a wheel at one side thereof, a bearing carried by said bracket, a shaft extending through said bearing and rigidly secured with a portion projecting from the bearing, a disc of insulation about said shaft secured in fixed position thereon, stationary contacts carried by said disc and spaced from each other circumferentially thereof, a movable disc of insulation rotatable about said shaft and having a sleeve at its center extending through the disc and fitting snugly about the shaft and radiating arms, a spring about the shaft urging the movable disc toward the stationary disc and a contact strip extending diametrically of the movable disc against a side thereof with its end portions extending along arms of the disc and secured thereto in position for engagement with the stationary contacts as the movable disc turns.

CLAUD J. JAMES.